April 29, 1924.

A. H. GREEN 1,491,854

AUTOMATIC SAFETY REGULATOR FOR AUTOMOBILES

Filed Jan. 19, 1921

Attest:
E. B. Mitchell

Arthur Hazen Green, Inventor:
by Frank P. Wentworth
his Atty.

Patented Apr. 29, 1924.

1,491,854

UNITED STATES PATENT OFFICE.

ARTHUR HAZEN GREEN, OF NEW YORK, N. Y., ASSIGNOR OF ONE-HALF TO FREDERICK W. TEVES, OF NEW YORK, N. Y.

AUTOMATIC SAFETY REGULATOR FOR AUTOMOBILES.

Application filed January 19, 1921. Serial No. 438,302.

*To all whom it may concern:*

Be it known that I, ARTHUR HAZEN GREEN, a citizen of the United States, residing at the borough of Manhattan, in the city, county, and State of New York, have invented certain new and useful Improvements in Automatic Safety Regulators for Automobiles, of which the following is a specification, reference being had therein to the accompanying drawings, which form a part thereof.

My invention relates to automatic speed regulators for automobiles, and more particularly to a type thereof which will prevent the application of power of the engine to the driving wheels when the vehicle attains a predetermined maximum speed.

It is desirable with motor-driven vehicles, to provide automatically acting means which will limit the speed at which the vehicle may be driven under the power of its engine, not only as a factor of safety in traffic upon city streets, but as a factor in minimizing wear and tear upon the vehicles themselves, it being recognized that excessive speeds of such vehicles, particularly in commercial vehicles adapted to carry heavy loads, will lead to breakage, excessive wear and rapid deterioration in the running gear of the vehicle.

A speed regulator made in accordance with my invention is designed primarily to prevent the transmission of power from the engine to the driving wheels when the speed of the vehicle has attained the maximum which the regulator is designed to permit. This control is operated directly from, and forms a part of, the power transmission system as distinguished from that type of regulator which varies the effective power of the engine, and is purely mechanical in all of its details so as not to be subjected to a possible disarrangement of parts from use. It is so constructed and arranged as to be inaccessible to the operator of the vehicle, thus avoiding possibility of its being tampered with in a manner to prevent operation, and thus permit the vehicle to be driven at a speed in excess of the maximum speed determined by the regulator.

A regulator embodying my invention operates to disconnect the main clutch connecting the engine with the transmission shaft, the construction being such that this clutch may be disconnected manually to permit the usual control of the power without interfering with the automatic regulator mechanism.

I also so construct the regulator that the power for actuating same will be applied through the transmission shaft, the actuating means therefor becoming automatically inoperative when the clutch is released, and resetting of the clutch being prevented until the vehicle is moving at a speed below the maximum for which the regulator is set.

A regulator embodying my invention is positioned adjacent the engine clutch and intermediate said clutch and the variable speed transmission gearing, being actuated by the transmission shaft section extending from one of these parts to the other. Owing to this condition, I so construct the regulator that it can become operative only when the said transmission gearing is set for high speed of the driving wheels, the speed of the vehicle when the said transmission gearing is set for a low or intermediate speed being below that at which the regulator is designed to release the engine clutch, although the shaft section actuating the regulator will run at higher speed.

The invention consists primarily in an automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to cooperate with the teeth upon said member, and a centrifugal governor carried by said shaft and operative upon said clutch plate, whereby said clutch plate will be engaged with said rotatable member when said shaft has reached a predetermined speed, and said member will be caused to actuate said slide to release said clutch against the tension of its spring; and in such other novel features of construction and combination of parts as are hereinafter set forth and described, and more particularly pointed out in the claims hereto appended.

Referring to the drawings.

Like letters refer to like parts throughout the several views.

Figure 1:
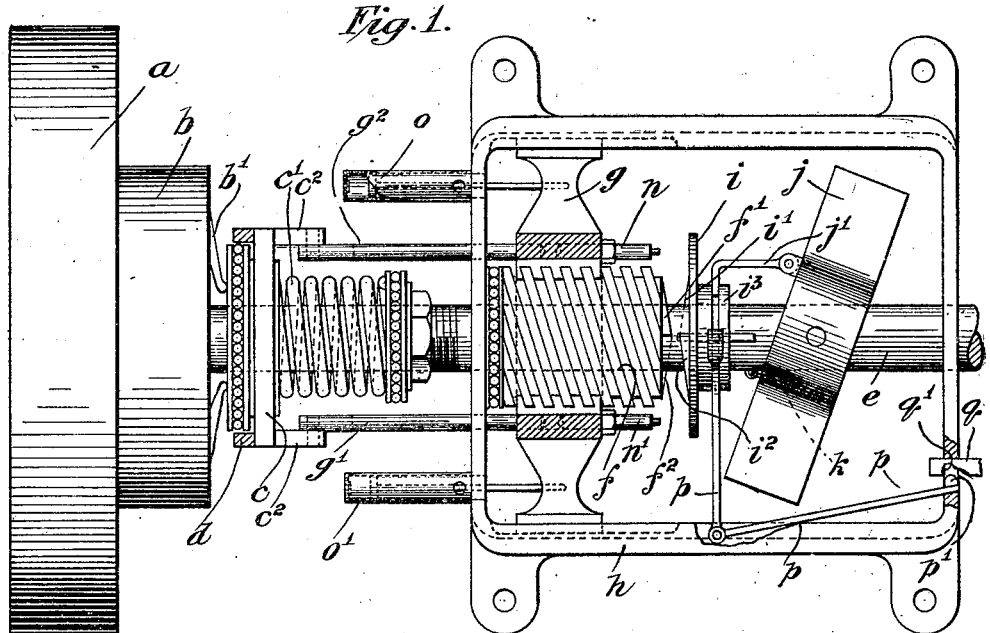
Fig. 1 is a plan view of an automatic speed regulator for automobiles embodying my invention.
Figure 2:
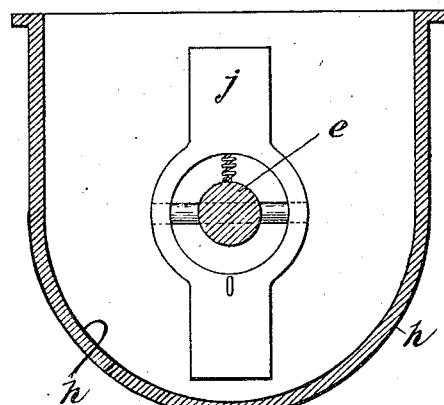
Fig. 2 is a detail end view of the governor.
Figure 3:
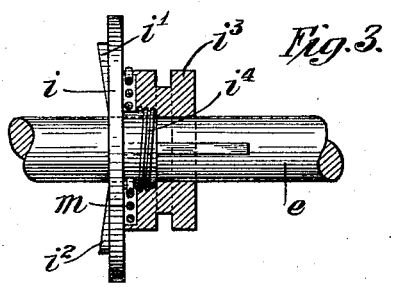
Fig. 3 is a detail view of the mount for the clutch plate.
Figure 4:
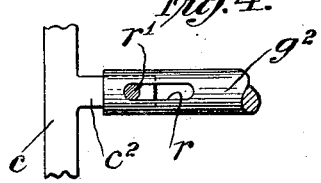
Fig. 4 is a detail view of the connection between the slide and the engine clutch mechanism.
Figure 5:
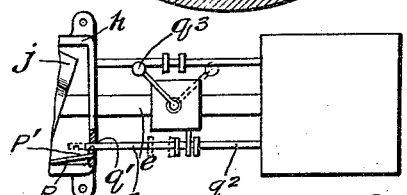
Fig. 5 is a diagrammatic showing of the gear shift lever, the rod acted upon thereby, and the extension carried thereby co-operating with the regulator, showing different positions of these parts in dotted lines.

In the embodiment of my invention shown in the drawings, the fly wheel of the engine is shown at $a$ and the usual clutch mechanism at $b$, the control levers for said clutch being indicated at $b'$. Acting upon said clutch levers $b'$ is a reciprocatory head $c$ which is normally thrust toward said clutch by the coiled spring $c'$, to set the clutch. Acting upon the head $c$ is the usual forked control lever $d$ connected with a foot pedal to permit the manual releasing of the clutch when desired.

One member of the clutch $b$ is operatively connected with a shaft $e$ which is also connected with the driving shaft of a variable speed transmission gearing not shown in the drawings.

The general construction and arrangment of parts above referred to is old and well known in automobile driving gears, and a more detailed description thereof is therefore unnecessary, my present invention relating to a regulator mechanism actuated from the shaft $e$ and operative upon the head $c$ in a manner to release the clutch $b$ when said shaft $e$ reaches a predetermined maximum speed of rotation with relation to the speed for which the variable speed transmission gearing is set, so as to cause the release of the clutch when the speed of the vehicle has attained a certain maximum.

Idly mounted upon the shaft $e$ is a sleeve $f$ having a peripheral cam surface or surfaces thereon and provided with clutch teeth $f'$—$f^2$ upon one end thereof. In the form of the invention shown, this rotatable member or sleeve $f$ is provided with exterior threads of high pitch, so as to ensure a rapid release of the clutch and permit the restoration of parts to normal and the resetting of the clutch under the tension of the spring $c'$.

Co-operating with the member $f$, is a traveller or slide $g$ having teeth thereon cooperating with said threads, said slide being connected by means of the rods $g'$—$g^2$ with the head $c$. The slide $g$ is mounted in suitable ways in the housing $h$, which housing incloses all of the working parts of the regulator so as to prevent the driver of an automobile from having access thereto in order to make the regulator inoperative and permit the vehicle to be driven at unauthorized high speeds.

Splined or otherwise slidably mounted upon the shaft $e$ adjacent the member $f$ carrying the clutch teeth $f'$—$f^2$, is a clutch plate $i$ having clutch teeth $i'$—$i^2$ adapted to co-operate with the teeth $f'$—$f^2$, said plate being adapted to be actuated to engage said clutch teeth by a centrifugal governor $j$ pivotally mounted upon and rotatable with the shaft $e$. The said governor $j$ is connected with the plate $i$ by means of the arm $j'$ pivotally connected with said governor and having a forked end engaging a groove in the hub $i^3$ of said plate, suitable lost motion being provided in the pivotal connection between said arm $j'$ and said centrifugal governor weight $j$ to compensate for the arc of movement of said weight while it is functioning to set the clutch teeth.

Acting upon the weight $j$ is a spring $k$, one end of which is connected with said weight and the other end of which is connected with the shaft $e$. The tension of the spring $k$ and the mass of metal in the weight $j$ will determine the velocities at which the said governor will become operative, the spring $k$ not being relied upon solely to restore the governor to its normal inoperative position or a position where the clutch plate $i$ will be disengaged from the rotatable member $f$.

To ensure a positive engagement of the teeth $f'$—$f^2$ with the teeth $i'$—$i^2$, I mount the plate $i$ upon its hub $i^3$ by means of loosely fitted co-operating screw threads $i^4$ and connect said plate with said hub by means of a helical spring $m$ so that a light engagement of the teeth $i'$—$i^2$ with the teeth $f'$—$f^2$ will impart a slight rotation to said plate and thus cause a positive engagement of the co-operating clutch teeth, the tensioning of the spring $m$ by reason of this movement developing a condition by which a return rotation will be imparted to the plate $i$ when the said teeth are disengaged from each other. This construction is merely to avoid a light engagement of said teeth which would result in clicking.

Carried by the slide $g$ are studs $n$—$n'$ adapted to be normally disengaged from the plate $i$ but to engage same and disconnect the clutch teeth thereof from the clutch teeth upon the member $f$ when a predetermined movement has been imparted to said slide, which movement will be that sufficient to release the clutch $b$. In this manner the operative effect of the actuating means of the regulator will be limited to that required to release said clutch.

To prevent a rapid return of the slide to normal, under the control of the spring $c'$, I provide the housing $h$ with dash pots $o'$—$o'$ the pistons of which are operatively connected with said slide.

The detailed construction of such dash pots is deemed unnecessary to a clear understanding of the invention, since the construction thereof is old and well known in the arts.

Mounted within the housing $h$ is a bell crank lever $p$, one arm of which is forked and straddles the hub $i^3$ of the clutch plate, the other arm thereof being provided with a nub $p'$ adapted to enter a recess $q'$ in the rod $q$, which rod is an extension of the shift rod $q^2$ for the shaft of the high speed gears of the transmission gearing. When the variable speed transmission gearing is set for high speed by the gear shift lever $q^3$ operative upon the rod $q^2$, the operative relation of the nub $p'$ and the recess $q'$ is such as to permit the oscillation of the lever $p$, but under all other conditions oscillation of said lever is prevented so that the centrifugal governor weight $j$ will be made inoperative through the restraint placed upon the hub $i^3$ by said lever $p$.

To permit the release of the clutch $b$ independently of the regulator mechanism, I provide the rods $g'$ and $g^2$ respectively with slots $r$ in which the pins $r'$ carried by the lugs $c^2$ upon the head $c$ are adapted to have movement.

The operation of the herein described mechanism is substantially as follows:—

Under normal conditions the parts will be in the position as shown in Fig. 1, the clutch $b$ being set by means of the spring $c'$ and the weight $j$ being positioned obliquely to the shaft $e$. Under this condition the shaft $e$ will turn freely, the member $f$ being held against movement by the thrust bearing at one end thereof and the teeth in the slide $g$.

The variable speed transmission gearing being set in high, the recess $q'$ in the rod $q$ will be in a position where the nub $p'$ may readily enter same.

As the speed of the vehicle increases, the R. P. M. of the shaft $e$ will increase, this increase causing centrifugal force to oscillate the governor weight about its pivots and thus impart a thrust to the plate $i$ through the arm $j'$, the movement of said plate being toward the member $f$ and more or less gradual as the shaft gathers speed. When the shaft $e$ is turning at the predetermined speed, which when the transmission gearing is set in high, will be proportionate to the speed of the vehicle, the clutch teeth $i'$—$i^2$ upon the plate $i$ will be brought into engagement with the clutch teeth $f'$—$f^2$ upon the member $f$. When the vehicle is at, or slightly above, the maximum speed for which the regulator is designed, there will be a positive engagement of said clutch teeth, but if the speed of the vehicle is slightly below the maximum, there will be a slight engagement of the tops of said teeth which might cause breakage and would cause wear and a clicking sound.

It is for this reason that I mount the plate $i$ in the manner described, so that the force of such impact of the tops of the clutch teeth will be sufficiently great to turn the plate $i$ slightly and cause the threads $i^4$ to advance the plate toward the member $f$ and cause a positive engagement of said teeth independently of further oscillatory movement of the weight $j$.

With the engagement of the teeth $i'$—$i^2$ with the teeth $f'$—$f^2$, the member $f$ will be rotated, thus actuating the slide $g$ and withdrawing the head $c$ from its operative engagement with the levers $b'$ and releasing the clutch against the tension of the spring $c'$.

During this movement of the slide $g$ the dash pots $o$—$o'$ will offer little or no resistance to such movement.

It will be noted that the power operative upon the clutch $b$ against the tension of the spring $c'$ is derived from the shaft $e$ and that this shaft will continue to rotate even after the clutch is released, as a result of the movement of the vehicle.

To limit the movement of the slide, I provide means, the studs $n$—$n'$ carried by said slide, which will automatically disconnect the clutch mechanism connecting the shaft $e$ and the member $f$ when the desired quantity of movement has been imparted to said slide. In practice the engagement of said studs with the plate $i$ will cause the disengagement of the co-operating clutch teeth $f'$—$f^2$ and $i'$—$i^2$ particularly as the movement of the slide is a very rapid one.

Immediately upon the clutch teeth clearing each other, the spring $m$ will impart a return movement to the plate $i$, and thus complete or ensure a complete disengagement of the teeth.

The dash pots $o$—$o'$ will retard the return movement of the slide under the control of the spring $c'$, and if the speed of the vehicle has not been reduced as the slide thus slowly returns, the slide will be followed by the plate $i$ under the control of the governor weight, so that the member $f$ will be again connected with the shaft $e$ before the clutch $b$ has been reset. In this manner the slide $g$ will have an intermittent reciprocatory movement and the clutch teeth upon the member $f$ and the plate $i$ will be intermittently engaged and disengaged to prevent the clutch being set until the speed of the shaft $e$ has been so reduced as to keep the speed of the vehicle within certain predetermined limits.

The functioning of the studs $n$—$n'$ will in large measure, relieve the spring $k$ from any function in restoring the governor weight $j$ to normal, except when the speed of the shaft *e* has been so reduced as to permit the resetting of the clutch *b*.

As the plate *i* is advanced under the control of the weight *j* to connect the member *f* to the shaft *e*, the bell crank lever *j'* will be rocked upon its pivot, the nub *p'* entering the recess *q'*. If, however, the lever *q* be shifted as in setting the variable speed transmission gearing for lower speeds, oscillation of the lever *p* will be prevented by the solid portions of the rod *q* and thus hold the weight *j* against oscillation and prevent the functioning of the regulator mechanism.

It will be observed that the foot lever *d* may be actuated in the usual manner to release the clutch *b* independently of the regulator mechanism by reason of the slot and pin connection between the head *c* and the rods $g'$—$g^2$.

The tension of the spring *k* and the mass of metal in the governor weight *j* may be so proportioned as to place any desired limit upon the speed of the shaft *e* before the clutch releasing mechanism becomes operative.

A regulator made in accordance with my invention, it will be observed, is purely mechanical throughout and acts automatically to disconnect the power transmission shaft from the engine, when an unauthorized speed of the vehicle is reached.

By mounting the regulator mechanism intermediate the variable speed gearing and the clutch, the operative parts of the regulator are inaccessible to the operator so that tampering with this mechanism is impossible.

The pitch of the threads upon the member *f* must be sufficiently high to cause a return rotation of this member as a result of the action of the teeth upon the slide *g* thereon, under the control of the spring *c'*.

It will be observed that the actual power for releasing the clutch mechanism is derived through the shaft *e* and that the load upon the centrifugal governor is limited to that required to shift the plate *i* axially of the shaft *e* into engagement with the rotatable member *f*, the disconnection of the clutch teeth upon said plate and said member being accomplished through the studs *n*—*n'* and entirely independently of the centrifugal governor structure.

It is not my intention to limit the invention to the details of construction shown in the drawings, it being apparent that such may be varied without departing from the spirit and scope of the invention.

Having described the invention, what I claim as new and desire to have protected by Letters Patent, is:—

1. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, and a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring.

2. An automatic speed regulator for automobiles embodying therein the combination with an engine clutch, a shaft connected therewith and with a variable speed gearing, and spring actuated means having a normal tendency to set said clutch, of a centrifugal governor carried by and rotatable with said shaft, means adapted to release said clutch in opposition to said spring actuated means, and means acted upon by said governor, whereby said last named means will be made operative when said shaft attains a certain predetermined maximum speed.

3. An automatic speed regulator for automobiles embodying therein the combination with an engine clutch, a shaft connected therewith and with a variable speed gearing, and spring actuated means having a normal tendency to set said clutch, of a centrifugal governor carried by and rotatable with said shaft, means adapted to release said clutch in opposition to said spring actuated means, means acted upon by said governor, whereby said last named means will be made operative when said shaft attains a certain predetermined maximum speed, and means whereby said governor is permitted to operate only when the variable speed gearing is set for high speed.

4. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring, and means whereby the co-operating clutch teeth upon said member and said plate will be automatically disengaged from each other when said traveller has been actuated to an extent to release said clutch.

5. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring, and studs carried by said traveller and adapted to engage said plate, whereby the clutch teeth upon said member and said plate will be disengaged from each other and the movement of said traveller limited to that required to release said clutch.

6. An automatic speed regulator for automobiles embodying therein the combination with an engine clutch, a head co-operating with said clutch and a spring acting thereon, of a rotatable member, a traveller adapted to be actuated thereby, a plurality of rods carried by said traveller and having elongated slots therein adjacent said head, pins carried by said head and entering said slots, whereby movement of said head to release said clutch independently of said traveller is permitted, said rotatable member having clutch teeth thereon and being idly mounted upon a shaft, a clutch plate slidably mounted upon and rotatable with said shaft having clutch teeth thereon adapted to co-operate with the teeth upon said member, and a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring.

7. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring, a recessed rod adapted to be operatively connected with the high speed gears of a variable speed gearing, and a bell crank lever pivotally mounted adjacent said governor, one arm of said lever being operatively connected with said plate and the other arm thereof having a nub thereon adapted to enter the recess in said rod, whereby movement of said plate is prevented except when said recess is positioned to receive said nub.

8. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring, means whereby the co-operating clutch teeth upon said member and said plate will be automatically disengaged from each other when said traveller has been actuated to an extent to release said clutch, and a retard device operative upon said traveller to prevent a quick return thereof when said clutch teeth are disconnected.

9. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate slidably mounted upon and rotatable with said shaft, having clutch teeth thereon adapted to co-operate with the teeth upon said member, a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring, means whereby the co-operating clutch teeth upon said member and said plate will be automatically disengaged from each other when said traveller has been actuated to an extent to release said clutch, a retard device operative upon said traveller to prevent a quick return thereof when said clutch teeth are disconnected, and means whereby actuation of said governor is permitted only when a variable speed transmission gearing is set for high speed.

10. An automatic speed regulator for automobiles embodying therein the combination with an engine clutch and a spring having a normal tendency to set same, of a rotatable member, a traveller adapted to be actuated thereby, connections between said traveller and said clutch mechanism, said rotatable member having clutch teeth thereon and being idly mounted upon a shaft, a clutch plate having clutch teeth thereon adapted to co-operate with the teeth upon said member, a hub for said plate slidably mounted upon and rotatable with said shaft, a screw-threaded connection between said hub and said plate permitting limited relative rotary movement of said plate and said hub, a helical spring connected with said plate and said hub, and a centrifugal governor carried by said shaft and operative upon said clutch plate, whereby said clutch plate will be engaged with said rotatable member when said shaft has reached a predetermined speed, and said member will be caused to actuate said traveller to release said clutch against the tension of its spring.

In witness whereof I have hereunto affixed my signature, in the presence of two subscribing witnesses, this 18th day of January, 1921.

ARTHUR HAZEN GREEN.

Witnesses:—
  F. T. WENTWORTH,
  FRIEDA KOEHLER.